Feb. 21, 1939.  J. A. ROBERTS  2,147,755
SIPHON AND THEFTPROOF GAS TANK COVER
Filed May 25, 1935  2 Sheets-Sheet 1

INVENTOR
John A. Roberts

Feb. 21, 1939.  J. A. ROBERTS  2,147,755

SIPHON AND THEFTPROOF GAS TANK COVER

Filed May 25, 1935  2 Sheets-Sheet 2

INVENTOR
John A. Roberts

Patented Feb. 21, 1939

2,147,755

UNITED STATES PATENT OFFICE 2,147,755

SIPHON AND THEFTPROOF GAS TANK COVER

John A. Roberts, New York, N. Y.

Application May 25, 1935, Serial No. 23,461

7 Claims. (Cl. 220—86)

This invention relates to a siphon and theftproof gas tank cover, the object and purpose of which, among others, is to provide an improved cover or cap especially intended for use on gasoline tanks of automobiles, motorcycles, motorboats, airplanes, tanks, tractors, or any other vehicles, machines or equipment similar to or akin to those listed or any other vehicle using gasoline or any other liquid fuel for power or as a means of locomotion, requiring by reason thereof a tank or other similar receptacle.

A further object of this invention is to provide a siphon and theftproof gasoline tank cover or cap which can replace and may be substituted for the conventional gasoline tank cap or cover now ordinarily employed, and commonly used, and which, when once installed into position becomes permanently locked in such a manner as to prevent removal thereof and prevent theft of gasoline from the tank.

A further object of this invention is to provide a siphon and theftproof gasoline tank cover which may be as quickly and easily installed in place of the conventional gas tank cover or cap now ordinarily and commonly used and employed, as is required in the removing or replacing the aforesaid gas tank cover or cap now commonly used and employed, and which, however, when once installed, automatically locks itself in such a manner as to prevent removal thereof.

A further object of this invention is to provide a siphon and theftproof gasoline tank cover or cap in which is enclosed a ratchet arrangement which co-operates with automatic cutters or locks, insuring the functioning of said cutters or locks, thereby further rendering impossible the removal of said gasoline tank cover or cap.

Still a further object of this invention is to provide a siphon and theftproof gas tank cover which co-operates with the gasoline hose nozzle so as to admit the nozzle of the aforesaid gasoline hose thereinto, and to allow and to permit the gasoline and/or other liquid fuel, as hereinbefore provided, to be poured into the tank therethrough, but which automatically closes itself when said nozzle is removed therefrom.

Still a further object of this invention is to provide a spring closed valve on this improved gas tank cover, which valve is depressed by the nozzle of the gasoline hose, and which, together with a specially designed V-shaped ridge or spacer operates in such a manner as to preclude and obviate the possibility of clogging or blocking the mouth or opening of the gasoline hose nozzle, when pouring gas etc. into the tank, because of the particular and specially designed outer contour of the aforesaid depressible valve head.

With the foregoing and other objects in view, as will hereinafter become apparent, this invention comprises the constructions, combinations and arrangements of parts hereinafter set forth, disclosed and shown on the accompanying drawings. In these drawings, Figure 1 is a vertical sectional view of the siphon and theftproof gasoline tank cover, of my invention, Figure 2 is a sectional view showing the nozzle inserted in the gasoline tank cover.

Figure 1:
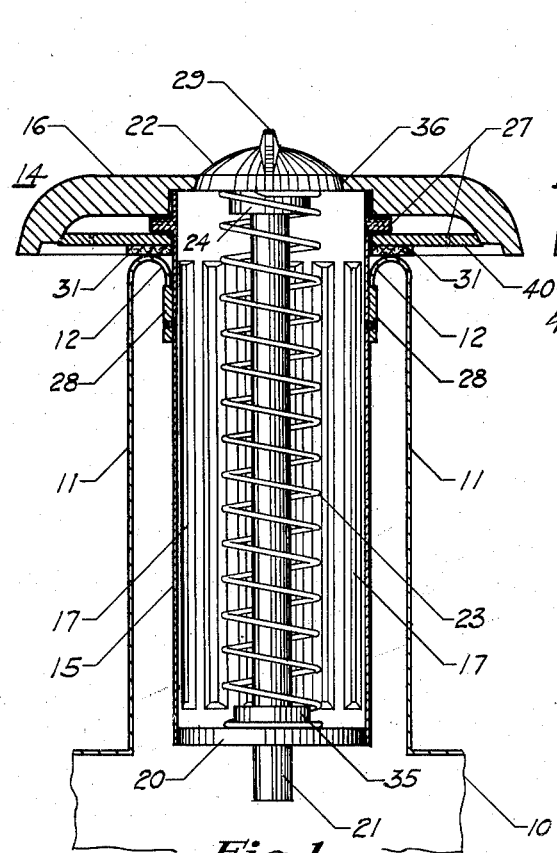

There is shown at 10 a fragmentary representation of the gasoline tank (or similar receptacle) of an automobile (etc., as listed hereinbefore) or other vehicle, having the usual opening 11, provided with the usual, interrupted screw 12 projecting therefrom to receive the conventional cover or cap.

The siphon and theftproof cover 14 constituting this invention comprises a short cylindrical member 15, the open end of which is secured to a dome cap 16. The cylindrical member 15 is provided with a plurality of longitudinal V-shaped slits or different shaped perforations 17 spaced around the side walls thereof and a plurality of very small openings 18 in bottom 20 thereof.

Extending through an aperture 19 in the spring guide hub 35 in the bottom 20 of the cylindrical member 15 is a stem 21 of a depressible valve 22. A spring 23 secured between the bottom 20 of cylindrical member 15 on spring guide hub 35 and on another suitably formed and special designed spring guide hub 24 on underside of depressible valve head 22 serves to urge the aforesaid depressible valve head into closing position within the port 25 in the dome cap 16.

A ground bevel 26 on valve head 22 is constructed so as to fit in snugly with ground seat 36 on dome cap 16 at port 25, and cooperates with the aforesaid ground seat 36 so as to limit the upward or return movement of the depressible valve 22 so as to hold it in a tightly closed position, as shown in Figure 1 and prevents the entrance of dirt, dust, water or other foreign matter therethrough.

Figure 2:
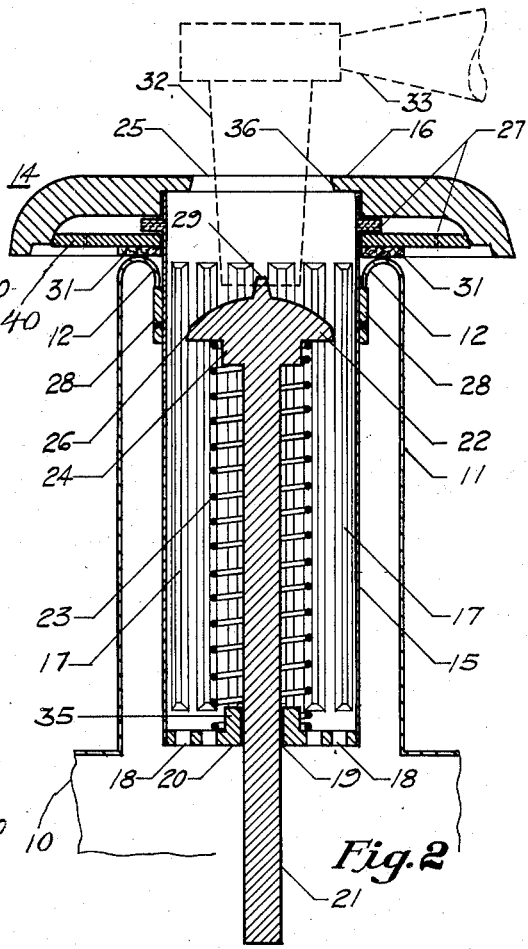
Figure 3:
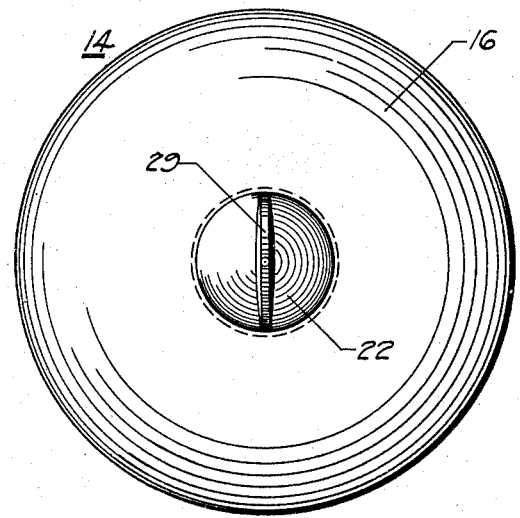
Figure 3 is a top plan view of the gasoline tank cap.
Figure 4:
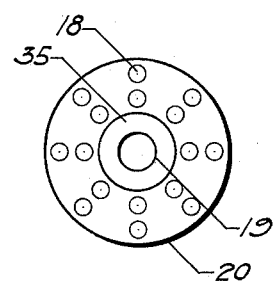
Figure 4 is a top plan view of an element of the gasoline tank cover comprising my invention.
Figure 7:
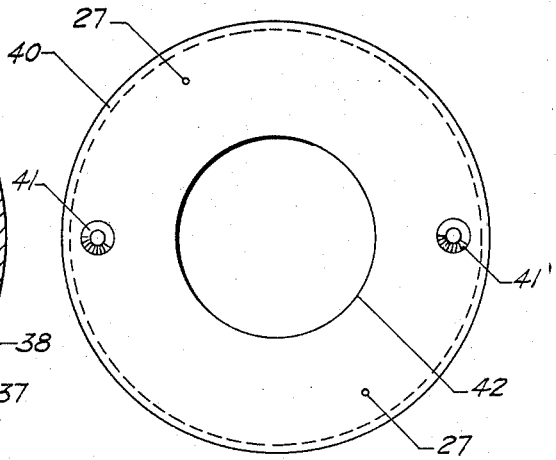
Figure 7 is a top plan view of the plate that covers the bottom of the gasoline tank cover or cap when assembled.

A breather hole 27 may be suitably located near top of cylindrical member 15 and underside of dome cap 16 through plate 40, as appears more specifically in Figures 1, 2, and 7 to permit the entrance of air into gasoline tank 10, as the gasoline is consumed in the usual manner.

Figure 5:
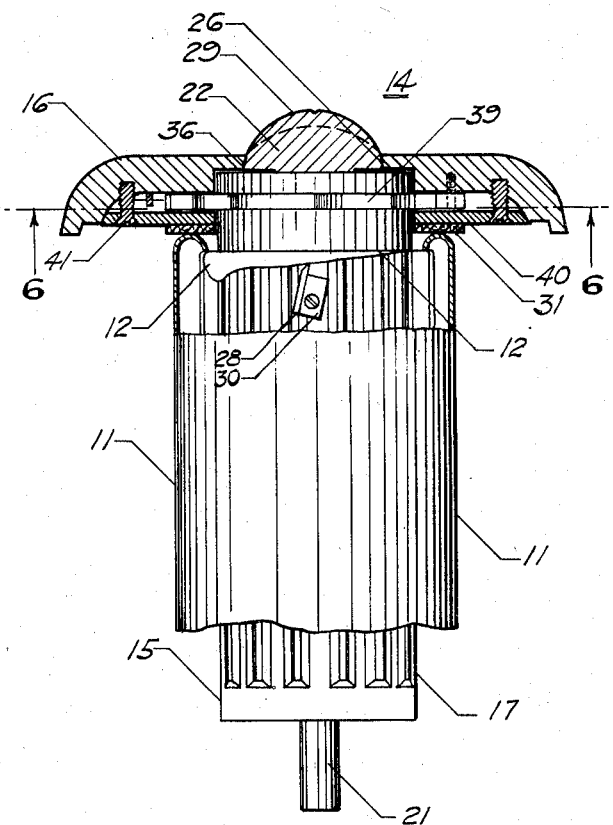
Figure 5 is a side view, partly in section and with parts broken away, of the gasoline tank cover, comprising my invention, positioned in the neck of the gasoline tank.

In order to hold and keep cover 14 in locked position in gasoline tank 10 and in order to render said cover 14 unremovable, the cylindrical member 15 is provided with two steel blocks 30 as shown in Figure 5, and on which are fastened hardened cutters or locks 28 which cooperate with interrupted screw 12 in the usual manner, allowing cover 14 to be inserted through opening 11, the neck of the gasoline tank, and secured by the cutter or lock 28 in the same manner that the conventional cap, now commonly used, is secured thereto.

However, cover 14 cannot be removed or taken out because of the biting effect of the sharp edge of cutter or lock 28 on interrupted screw 12 when same is turned in the opposite direction required to put the cover 14 thereon. By reason thereof cover 14 can be easily placed in position in the same manner as the conventional cover now commonly used but cannot be removed.

Figure 6:
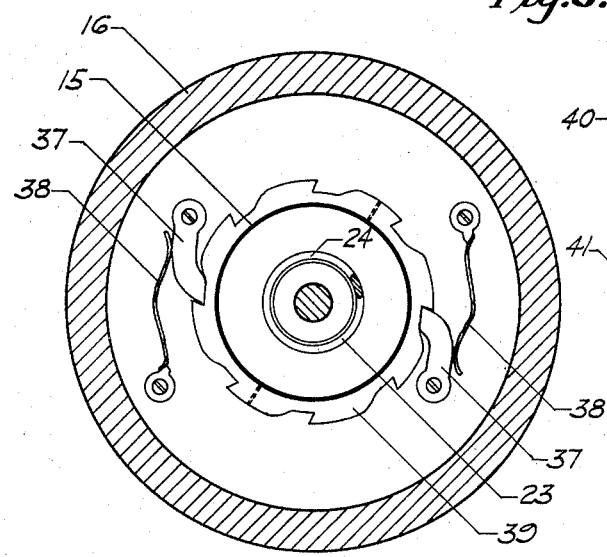
Figure 6 is a sectional view of the bottom of the gasoline tank cover or cap taken on line 6—6 of Figure 5.

To further insure the unremovability of cover 14 a ratchet feature 39 has been employed and placed directly underneath dome cap 16 and directly over plate 40 as appears in Figure 5, which ratchet co-operates with a pair of pawls 37, as appears more specifically in Figure 6. Ratchet 39, which is a one-way ratchet, in no way affects or interferes with the operation of the cutters or locks, hereinbefore described in the preceding paragraph and co-operates with the said cutters or locks 28, by reason of the cooperation of said ratchet 39, Figure 6, and a pair of pawls 37 that engage the ratchet 39, at all times, in the direction necessary to fasten and render unremovable, cover 14, when once installed into gasoline tank neck 11.

Ratchet 39 permits turning cover 14 in the direction opposite that required in the preceding paragraph, the pawls disengaging and automatically re-engaging by reason of pressure exerted upon them by springs 38, this free motion in no way affects the feature of unremovability of cover 14, but instead, increases and insures the functioning of the cutters or locks 28. Ratchet 39 is solidly fastened to cylindrical member 15, and both are then inserted into dome cap 16, which action automatically engages the pair of pawls 37 which together with springs 38 are solidly fastened to dome cap 16. A plate 40, Figure 7, having an aperture 42 to allow cylindrical member 15 to run freely therethrough, and breather holes 27, as shown in Figure 7, is then solidly fastened by screws 41 or otherwise to dome cap 16, thereby enclosing and encasing the complete ratchet arrangement 39 in dome cap 16. The combination of the complete dome cap 16, with the ratchet arrangement 39 enclosed therein, together with the cylindrical member 15, acting in conjunction with cutters or locks 28, make it impossible to remove the gasoline tank cover when once installed in tank neck 11.

This ratchet arrangement is comprised of a ratchet ring 39, with teeth cut into it, which ring is solidly fastened to the cylindrical member 15, and positioned just over the annular plate 40, a pair of pawls 37 and a pair of springs 38 fastened to cover 16. These parts are so constructed and so positioned that in assembling this gasoline tank cover 14 the pawls 37 by reason of the pressure exerted upon them by the springs 38, as appears more specifically in Figure 6, automatically engage the ratchet 39. Said ratchet arrangement, being a one way ratchet permits rotation of cover 16, relative to cylindrical member 15, only when cover 16 is rotated counterclockwise. If it is attempted to rotate cover 16 relative to cylindrical member 15 clockwise pawls 37 will engage ratchet 39 and prevent the relative rotation of cover 16 and cylindrical member 15. Upon inserting the assembled siphon and theftproof gasoline tank cover 14 into gasoline tank neck 11, the said cover is turned in the clockwise direction to secure it to tank neck 11, at the conventional interrupted screw 12, in the same manner that the conventional cap now commonly used is secured. The ratchet arrangement hereinbefore described does not permit relative rotation between cylindrical member 15 and cover 16, in this direction, but on the contrary locks this siphon and theftproof gasoline tank cover 14 as a unit and thereby cooperates with cutters and/or locks 28.

Ratchet 39, as stated, only permits relative rotation between cylindrical member 15 and cover 16 when said cylindrical member 15 is rotated counterclockwise. Thus while cover 16 may be rotated counterclockwise relative to cylindrical member 15 after this cover 14 is completely assembled and inserted in the gasoline tank neck 11, the relative rotation permitted is limited only to the cover 16 and could not effect the disengagement of cutters and/or locks 28 from interrupted screw 12. If cover 16 is rotated clockwise the sole effect is to more securely engage the cutters and/or locks 28 with the interrupted screw 12. Thus with this arrangement it is impossible to remove this cover 14 comprising this invention, from the gasoline tank by rotating the said cover 14 and it is therefore, permanently and irremovably positioned. Since this siphon and theftproof gasoline tank cover has been purposely so designed that screws 41 are not accessible when the said siphon and theftproof gasoline tank cover 14 is inserted in the gasoline tank the said cover 14 is definitely irremovable and definitely obviates any possibility of fraudulently and unlawfully siphoning and withdrawing of gasoline and/or other fuel from the gasoline tank.

In order to eliminate the possibility of gasoline or other similar fluids being jarred out of the gasoline tank between cap 16 and tank neck 11 there is placed on the underside of cap 16 a leather washer 31 which by reason of the clamping action of the lock or cutter 28 on interrupted screw 12 pulls or draws cap 16 down tightly onto tank neck 11 thereby making it as secure as the conventional cap now commonly employed and preventing theft or removal of the said cover 14.

The valve 22 is provided with a V-shaped ridge or spacer 29 projecting upwards, which ridge or spacer 29 is especially designed to render impossible the closing, choking or otherwise obstructing in any manner whatsoever the mouth or opening of the nozzle 32 of the gasoline hose 33 when same is placed onto valve 22.

This specially designed feature 29 eliminates, obviates and does away with the possibility of choking, clogging, closing or otherwise obstructing the mouth or opening of the nozzle 32 of the gasoline hose 33 by reason of the top of valve 22 fitting tightly and snugly into the aforesaid opening in the nozzle 32.

In operation, in order to pour gasoline or any other fluid as hereinbefore provided, into the tank 10, the top of the dome cap 16 and valve 22 will first be wiped off to remove any dust or other dirt or matter that may have accumulated thereon and then nozzle 32 of the gasoline hose 33 is merely pressed thereagainst, thereby depressing the valve 22, permitting the nozzle 32 to enter in opening 25 and allowing gasoline, etc., to enter into cylindrical member 15 whence it escapes through the V-slots 17 and apertures 18 of cylindrical member 15 into tank 10.

Spring 23 is a sufficiently stiff spring so as to securely hold the valve head 22 in closed position and further so as to require a rigid member of at least the weight and mass of the conventional gas hose nozzle 32, now commonly employed to depress the same and thereby open the port 25. As a result of this and of the limited space between the edges of the valve 22 and the inside of the cylindrical member 15, it is impossible to insert a rubber hose or any other conduit or member into tank 10 for the purpose of fraudulently and unlawfully siphoning the gasoline therefrom.

Further, member 15 is of such short length that it will not normally reach to the gasoline level in the tank 10 unless tank 10 be so full as to be overflowing. Even if a rigid conduit should be inserted through port 25 while valve 22 were held depressed, it would be impossible to siphon any gasoline from tank 10 because the sidewalls of the cylindrical member 15 would prevent the end of the conduit from reaching the gasoline level.

The novel features of the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention what is claimed is:

1. As an article of manufacture for use with fuel storage tanks having a fuel receiving opening provided with an interrupted screw, a cover for said fuel receiving opening comprising a cylindrical member insertable in said opening, a cover for said cylindrical member, locking means fastened to said cylindrical member adapted when said cylindrical member is rotated in one direction to lock said cylindrical member to said interrupted screw, and one-way movement means cooperating with said cylindrical member, the said locking means fastened thereto and said cover allowing rotation of said cylindrical member in said one direction but preventing rotation of said cylindrical member in a direction opposite to said one direction.

2. As an article of manufacture for use with fuel storage tanks having a fuel receiving opening provided with an interrupted screw, a cylinder insertable in said opening, means fastened to said cylinder adapted to lock said cylinder to said interrupted screw when said cylinder is rotated in one direction, a dome cover for said cylinder having a normally closed depressible valve therein adapted to cover the external end of said cylinder, an annular plate fastened to said dome cover and extending to said cylinder, a rachet fastened to said cylinder, pawls adapted to engage said rachet fastened on said dome cover, said rachet and pawls being arranged to prevent rotation of said dome cover relative to said cylinder in the direction necessary to engage said locking means with said interrupted screw and allow rotation of dome cover relative to cylinder in the direction opposite to the aforesaid one direction and to lock said dome cover and said cylinder for rotation as a unit in said one direction.

3. As an article of manufacture for use with fuel storage tanks having a fuel receiving opening provided with an interrupted screw, a siphon and theftproof cover comprised of a cylindrical member, a dome cover positioned on one end of said cylindrical member, a pair of automatic locks positioned for engagement with said interrupted screw and attached to said cylindrical member, an annular plate attached to said cover, a rachet attached to said cylindrical member and positioned between said plate and said cover, pawls supported from said cover and adapted to engage said rachet, said rachet and pawls being arranged to allow relative movement of the cylindrical member and cover when the cover is rotated in a counterclockwise direction, and prevent relative rotation when cover is rotated clockwise, whereby when the cover is rotated clockwise, said cover and cylindrical member rotate as a unit and said locks engage said interrupted screw.

4. As an article of manufacture for use with fuel storage tanks having a fuel receiving opening provided with an interrupted screw, a cover for said fuel receiving opening comprising a cylindrical member, a dome cover for said cylindrical member adapted to cover the external end of said cylinder, having a normally closed depressible valve therein, an annular plate fastened to said dome cover and extending to said cylinder, a leather washer thereunder, a one-way ratchet arrangement above said annular plate and a pair of automatic locks positioned to engage said interrupted screw and attached to the said cylinder on the side of and near the top of said cylinder on a line with said interrupted screw in gasoline tank neck, said locks including a block of steel to which is attached a hardened piece of steel ground to a sharp edge and set at an angle.

5. As an article of manufacture for use with fuel storage tanks having a fuel receiving opening provided with an interrupted screw, a cylinder insertable in said opening, said cylinder being provided with a plurality of different shaped perforations in the side walls thereof to permit the pouring in of fuel into the said gasoline tank, said different shaped perforations being of such size as to prevent inserting therethrough any siphoning means, means fastened to the said cylinder adapted to lock said cylinder to said interrupted screw when the said cylinder is rotated in one direction, a dome cover for said cylinder having a hole therein, a normally closed depressible valve, adapted to seat on the edges of said hole from within said cylinder, an annular plate fastened to said cylinder, a ratchet fastened to said plate, pawls adapted to engage said ratchet fastened to said cover, said ratchet and pawls being arranged to lock said dome cover and said cylinder as a unit in one direction and to allow rotation of said dome cover relative to said cylinder in the direction opposite to the aforesaid one direction.

6. As an article of manufacture for use with tanks having a material receiving opening provided with an interrupted screw, a cylinder insertable in said opening, said cylinder having perforations therein for the passage of material therethrough, locking means fastened to said cylinder adapted to engage said interrupted screw when said cylinder is rotated in one direction, a cover for said cylinder, one-way clutching mechanism connected to said cylinder and said cover, said clutching mechanism being such that said cylinder rotates with said cover in the direction required to engage said locking means with said interrupted screw.

7. As an article of manufacture for use with tanks having a material receiving opening provided with an interrupted screw, a cover for said material receiving opening comprised of a cylinder insertable in said opening, a cover for said cylinder, locking means fastened to said cylinder adapted to engage said interrupted screw, one-way clutching mechanism connected to said cylinder and said cover, said clutching mechanism cooperating with said locking means, allowing rotation of said cylinder and said cover together, in the direction necessary to effect engagement of said locking means and said interrupted screw, and allowing free relative rotation of the cover alone, in the direction opposite the said one direction, without loosening the said engagement between said locking means and the said interrupted screw.

JOHN A. ROBERTS.